(12) United States Patent
Hausler et al.

(10) Patent No.: US 12,586,215 B2
(45) Date of Patent: Mar. 24, 2026

(54) VEHICLE POSE

(71) Applicants: Ford Global Technologies, LLC, Dearborn, MI (US); QUEENSLAND UNIVERSITY OF TECHNOLOGY, Brisbane (AU)

(72) Inventors: Stephen Hausler, Queensland (AU); Shubham Shrivastava, Santa Clara, CA (US); Punarjay Chakravarty, Campbell, CA (US); Ankit Girish Vora, Northville, MI (US); Michael Milford, Queensland (AU); Sourav Garg, Queensland (AU)

(73) Assignees: FORD GLOBAL TECHNOLOGIES, LLC, Dearborn, MI (US); QUEENSLAND UNIVERSITY OF TECHNOLOGY, Brisbane (AU)

( * ) Notice: Subject to any disclaimer, the term of this patent is extended or adjusted under 35 U.S.C. 154(b) by 308 days.

(21) Appl. No.: 18/327,919

(22) Filed: Jun. 2, 2023

(65) Prior Publication Data

US 2024/0404081 A1 Dec. 5, 2024

(51) Int. Cl.
*G06T 7/246* (2017.01)
*G01P 13/00* (2006.01)
(Continued)

(52) U.S. Cl.
CPC .............. *G06T 7/248* (2017.01); *G01P 13/00* (2013.01); *G06T 7/10* (2017.01); *G06T 7/74* (2017.01);
(Continued)

(58) Field of Classification Search
CPC .. G06T 7/248; G06T 7/74; G06T 7/10; G06T 2207/10016; G06T 2207/30244;
(Continued)

(56) References Cited

U.S. PATENT DOCUMENTS

| | | | | |
|---|---|---|---|---|
| 8,930,173 | B2 * | 1/2015 | Ikeda ..................... | G05B 17/02 |
| | | | | 703/2 |
| 8,965,056 | B2 * | 2/2015 | Matsuda ................ | G08G 1/166 |
| | | | | 382/104 |

(Continued)

FOREIGN PATENT DOCUMENTS

JP 7143857 B2 9/2022

OTHER PUBLICATIONS

Ye, C. et al., "6-DOF Pose Estimation of a Robotic Navigation Aid by Tracking Visual and Geometric Features," ResearchGate, IEEE Transactions on Automation Science and Engineering, Oct. 2015, 13 pages.

*Primary Examiner* — Pinalben Patel
(74) *Attorney, Agent, or Firm* — Frank A. MacKenzie; Brooks Kushman P.C.

(57) ABSTRACT

A computer includes a processor and a memory, and the memory stores instructions executable by the processor to determine a quantity of relative motion between a host vehicle and a target vehicle; in response to the quantity of relative motion being below a threshold, determine a pose of the host vehicle subject to a constraint on motion of the host vehicle; and in response to the quantity of relative motion being above the threshold, determine the pose of the host vehicle without the constraint.

20 Claims, 4 Drawing Sheets

(51) Int. Cl.

| | |
|---|---|
| *G06T 7/10* | (2017.01) |
| *G06T 7/73* | (2017.01) |
| *G06V 20/58* | (2022.01) |
| *G06V 20/70* | (2022.01) |

(52) U.S. Cl.
CPC .............. *G06V 20/58* (2022.01); *G06V 20/70* (2022.01); *G06T 2207/10016* (2013.01); *G06T 2207/30244* (2013.01); *G06T 2207/30252* (2013.01); *G06V 2201/08* (2022.01)

(58) Field of Classification Search
CPC .......... G06T 2207/30252; G06V 20/70; G06V 20/58; G06V 2201/08; G01P 13/00
See application file for complete search history.

(56) References Cited

U.S. PATENT DOCUMENTS

| | | | |
|---|---|---|---|
| 9,031,809 B1 | 5/2015 | Kumar et al. | |
| 11,466,990 B2 | 10/2022 | Roumeliotis et al. | |
| 2015/0142248 A1 | 5/2015 | Han et al. | |
| 2015/0298621 A1* | 10/2015 | Katoh ...................... | G08G 1/16 348/148 |
| 2016/0193999 A1* | 7/2016 | Sasabuchi ................ | B60T 7/22 701/301 |
| 2019/0286153 A1 | 9/2019 | Rankawat et al. | |
| 2019/0333381 A1* | 10/2019 | Shalev-Shwartz ... | G06V 20/584 |
| 2020/0130864 A1 | 4/2020 | Brockers et al. | |
| 2021/0209797 A1 | 7/2021 | Lee et al. | |

* cited by examiner

VEHICLE POSE

BACKGROUND

Vehicles often include cameras. A camera can detect electromagnetic radiation in some range of wavelengths. Possible frequencies that a camera can detect include visible light, infrared radiation, ultraviolet light, or some range of wavelengths including visible, infrared, and/or ultraviolet light. Types of cameras include charge-coupled devices (CCD) and complementary metal oxide semiconductors (CMOS).

DETAILED DESCRIPTION

Figure 1:
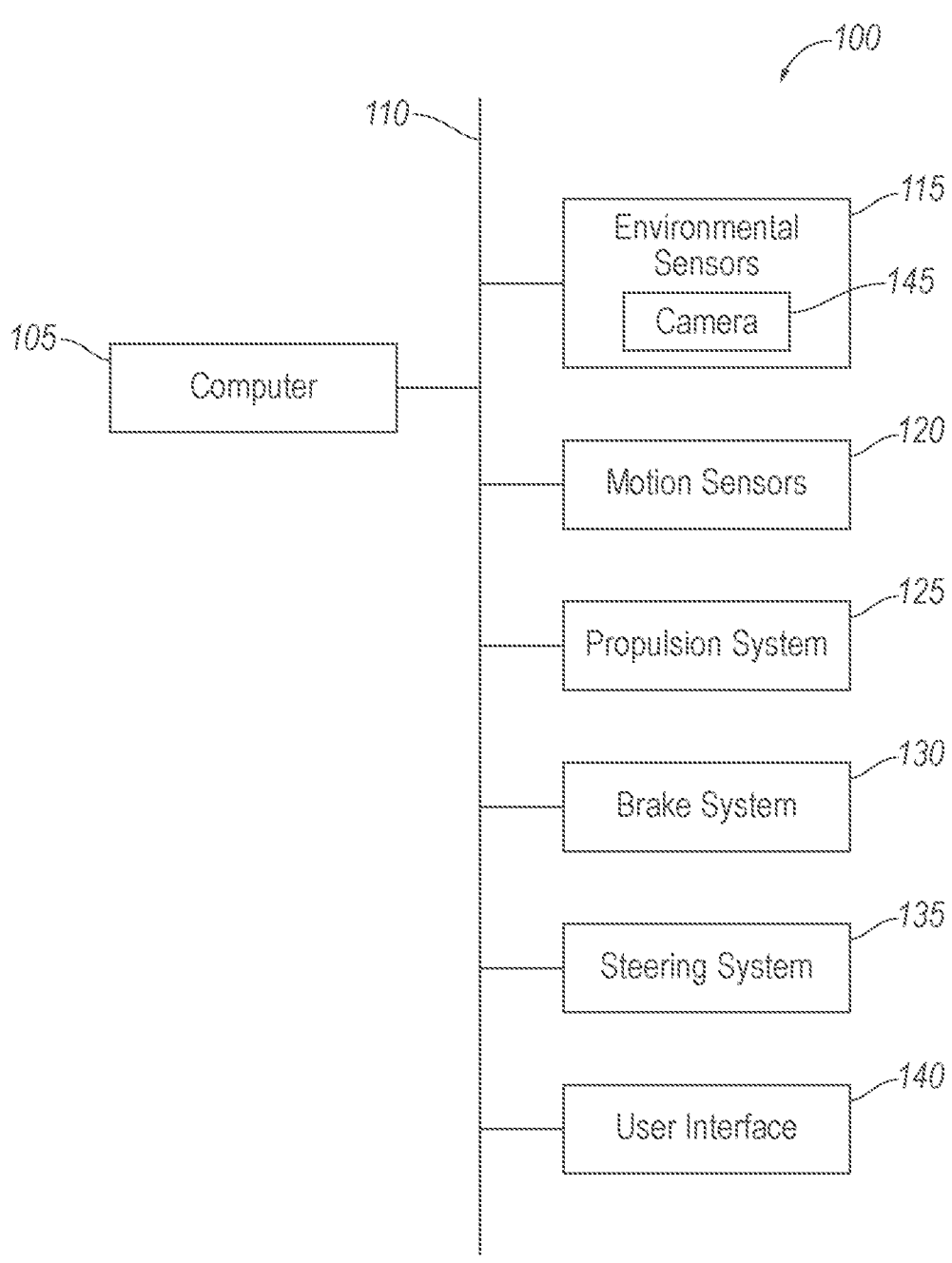
FIG. 1 is a block diagram of an example host vehicle.

This disclosure provides techniques for determining a pose of a vehicle. The vehicle will be referred to as the "host vehicle" to differentiate from other vehicles in the environment, which will be referred to as "target vehicles." A computer of the host vehicle may be programmed to determine a quantity of relative motion between the host vehicle and a target vehicle; in response to the quantity of relative motion being below a threshold, determine the pose of the host vehicle subject to a constraint on motion of the host vehicle; and in response to the quantity of relative motion being above the threshold, determine the pose of the host vehicle without the constraint. For example, if the target vehicle remains 100 feet forward and 10 feet left of the host vehicle over a period of time, then the computer determines the pose subject to the constraint, e.g., determines the pose from within a narrower range of possible poses or weighted toward a narrower range of possible poses. If the target vehicle increases a distance, e.g., a lateral distance, from the host vehicle, then the computer determines the pose without the constraint. The use of the constraint can increase the accuracy of the determined pose in certain situations, and the quantity of relative motion can be used to identify some of those situations. The computer may then actuate the host vehicle based on the pose, e.g., by executing an advanced driver assistance system (ADAS) that takes the pose of the host vehicle as an input.

A computer includes a processor and a memory, and the memory stores instructions executable by the processor to determine a quantity of relative motion between a host vehicle and a target vehicle; in response to the quantity of relative motion being below a threshold, determine a pose of the host vehicle subject to a constraint on motion of the host vehicle; and in response to the quantity of relative motion being above the threshold, determine the pose of the host vehicle without the constraint.

In an example, the instructions may further include instructions to actuate a component of the host vehicle based on the pose of the host vehicle.

In an example, the constraint may constrain the pose of the host vehicle toward a predicted pose, and the predicted pose may be a current pose translated by a distance in a current direction of travel of the host vehicle. In a further example, the distance may be a product of a timestep and a current velocity of the host vehicle.

In an example, the instructions may further include instructions to determine the quantity of relative motion based on image data depicting the target vehicle. In a further example, the image data may include a first image frame depicting the target vehicle and a second image frame depicting the target vehicle, and the quantity of relative motion may include a metric of change between the target vehicle as depicted in the first image frame and the target vehicle as depicted in the second image frame. In a yet further example, the instructions to determine the quantity of relative motion may include instructions to compare a first set of pixels forming the target vehicle in the first image frame with a second set of pixels forming the target vehicle in the second image frame. In a still yet further example, the metric of change may be a mean pixel shift based on the first set of pixels and the second set of pixels, and the instructions to compare the first set of pixels with the second set of pixels may include instructions to determine the mean pixel shift.

In another still yet further example, the instructions may further include instructions to extract a first set of features from the first set of pixels, and extract a second set of features from the second set of pixels, and the instructions to compare the first set of pixels with the second set of pixels may include instructions to compare the first set of features with the second set of features. In a continuing example, the instructions may further include instructions to determine a set of feature correspondences between the first set of pixels and the second set of pixels, and determine per-pixel shifts between the feature correspondences. In a further continuing example, the metric of change may be a mean pixel shift based on the first set of pixels and the second set of pixels, and the instructions to compare the first set of pixels with the second set of pixels may include instructions to determine the mean pixel shift from the per-pixel shifts.

In another still yet further example, the instructions may further include instructions to perform semantic segmentation classifying pixels in the first image frame and second image frame as a first category, the first category indicating vehicles, and determine the first set of pixels and second set of pixels based on the pixels classified as the first category.

In another still yet further example, the instructions may further include instructions to perform object identification on the first image frame and the second image frame to identify vehicles, apply bounding boxes around the respective identified vehicles, and determine the first set of pixels and second set of pixels based on the bounding boxes. In a continuing example, the instructions may further include instructions to perform semantic segmentation classifying pixels in the first image frame and second image frame as a first category, the first category indicating vehicles, and the first set of pixels and second set of pixels may be from pixels that are both inside the bounding boxes and classified as the first category.

In another yet further example, the instructions may further include instructions to identify the target vehicle in the second image frame as a same vehicle as the target vehicle in the first image frame.

In another further example, the image data may originate from a camera mounted to the host vehicle.

In an example, the instructions to determine the pose of the host vehicle may include instructions to determine the pose of the host vehicle based on a measurement variance of sensors of the host vehicle, and the constraint is an increase in value of the measurement variance.

In an example, the instructions to determine the pose of the host vehicle may include instructions to execute a Kalman filter, and state variables of the Kalman filter may include the pose of the host vehicle. In a further example, the instructions may further include instructions to calculate a gain of the Kalman filter based on a measurement variance of sensors of the host vehicle, and the constraint may be an increase in value of the measurement variance.

With reference to the Figures, wherein like numerals indicate like parts throughout the several views, a computer 105 includes a processor and a memory, and the memory stores instructions executable by the processor to determine a quantity of relative motion between a host vehicle 100 and a target vehicle 200; in response to the quantity of relative motion being below a threshold, determine a pose of the host vehicle 100 subject to a constraint on motion of the host vehicle 100; and in response to the quantity of relative motion being above the threshold, determine the pose of the host vehicle 100 without the constraint.

With reference to FIG. 1, the host vehicle 100 may be any passenger or commercial automobile such as a car, a truck, a sport utility vehicle, a crossover, a van, a minivan, a taxi, a bus, etc. The host vehicle 100 may include the computer 105, a communications network 110, environmental sensors 115, motion sensors 120, a propulsion system 125, a brake system 130, a steering system 135, and a user interface 140.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through the communications network 110. The communications network 110 may be, e.g., a controller area network (CAN) bus, Ethernet, WiFi, Local Interconnect Network (LIN), onboard diagnostics connector (OBD-II), and/or any other wired or wireless communications network. The computer 105 may be communicatively coupled to the environmental sensors 115, the motion sensors 120, the propulsion system 125, the brake system 130, the steering system 135, the user interface 140, and other components via the communications network 110.

The environmental sensors 115 may detect the external world, e.g., objects and/or characteristics of surroundings of the vehicle, such as other vehicles, road lane markings, traffic lights and/or signs, pedestrians, etc. For example, the environmental sensors 115 may include radar sensors, ultrasonic sensors, scanning laser range finders, light detection and ranging (lidar) devices, and image processing sensors such as a camera 145.

The camera 145 can detect electromagnetic radiation in some range of wavelengths. For example, the camera 145 may detect visible light, infrared radiation, ultraviolet light, or some range of wavelengths including visible, infrared, and/or ultraviolet light. For example, the camera 145 can be a charge-coupled device (CCD), complementary metal oxide semiconductor (CMOS), or any other suitable type. The camera 145 is mounted to the host vehicle 100 and may be fixed relative to the host vehicle 100, e.g., fixedly mounted to a body of the host vehicle 100. The camera 145 may be oriented generally horizontally.

The motion sensors 120 may detect the position and/or orientation of the host vehicle 100. For example, the motion sensors 120 may include global navigation satellite system (GNSS) sensors such as global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The GPS sensor receives data from GPS satellites. The Global Positioning System (GPS) is a global navigation satellite system. The satellites broadcast time and geolocation data. The GPS sensor can determine a position of the host vehicle 100, i.e., latitude and longitude, based on receiving the time and geolocation data from multiple satellites simultaneously.

The propulsion system 125 of the host vehicle 100 generates energy and translates the energy into motion of the host vehicle 100. The propulsion system 125 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 125 can include an electronic control unit (ECU) or the like that is in communication with and receives input from the computer 105 and/or a human operator. The human operator may control the propulsion system 125 via, e.g., an accelerator pedal and/or a gear-shift lever.

The brake system 130 is typically a conventional vehicle braking subsystem and resists the motion of the host vehicle 100 to thereby slow and/or stop the host vehicle 100. The brake system 130 may include friction brakes such as disc brakes, drum brakes, band brakes, etc.; regenerative brakes; any other suitable type of brakes; or a combination. The brake system 130 can include an electronic control unit (ECU) or the like that is in communication with and receives input from the computer 105 and/or a human operator. The human operator may control the brake system 130 via, e.g., a brake pedal.

The steering system 135 is typically a conventional vehicle steering subsystem and controls the turning of the wheels. The steering system 135 may be a rack-and-pinion system with electric power-assisted steering, a steer-by-wire system, as both are known, or any other suitable system. The steering system 135 can include an electronic control unit (ECU) or the like that is in communication with and receives input from the computer 105 and/or a human operator. The human operator may control the steering system 135 via, e.g., a steering wheel.

The user interface 140 presents information to and receives information from an operator of the host vehicle 100. The user interface 140 may be located, e.g., on an instrument panel in a passenger cabin of the host vehicle 100, or wherever may be readily seen by the operator. The user interface 140 may include dials, digital readouts, screens, speakers, and so on for providing information to the operator, e.g., human-machine interface (HMI) elements such as are known. The user interface 140 may include buttons, knobs, keypads, microphone, and so on for receiving information from the operator.

Figure 2:
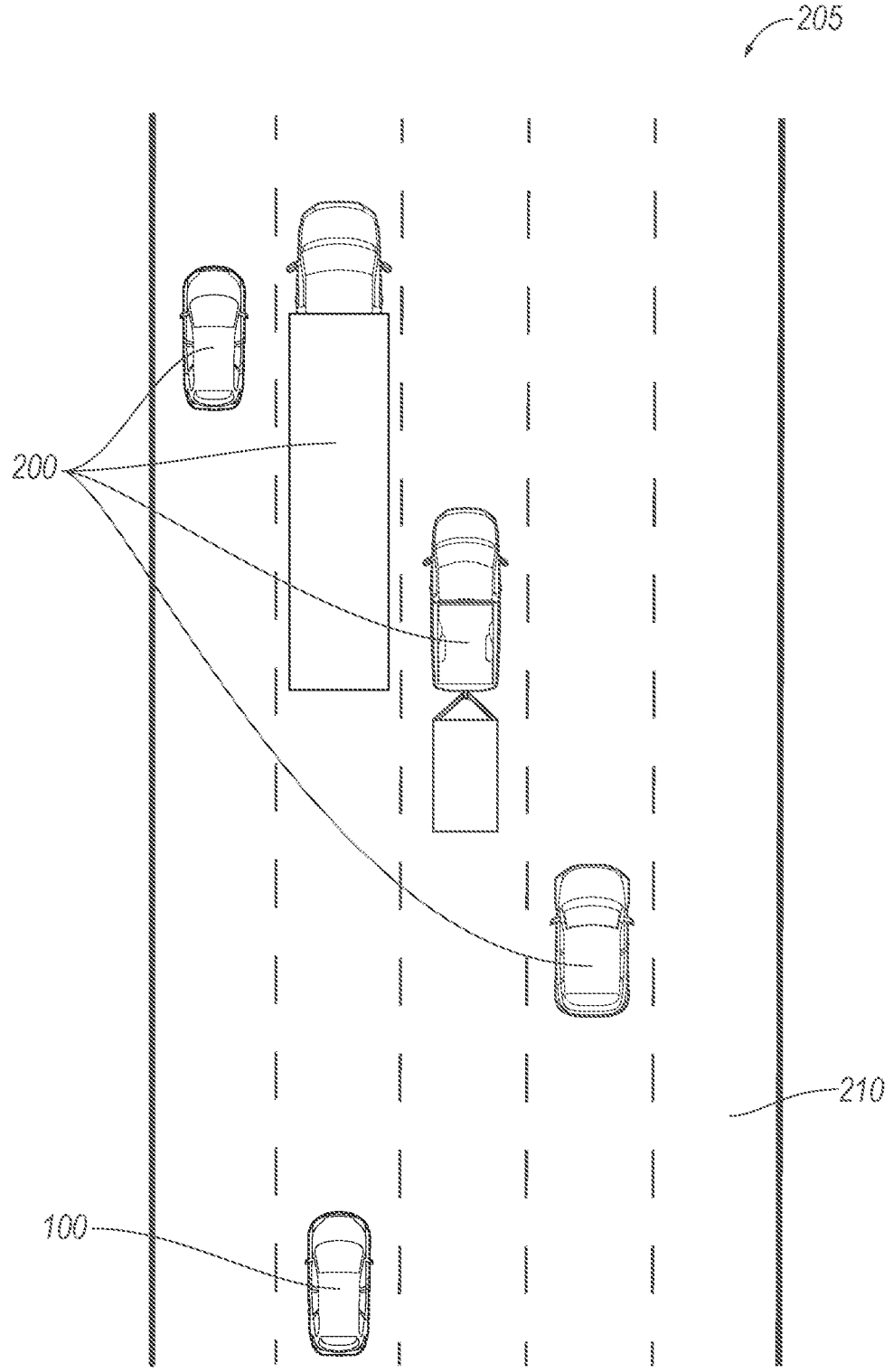
FIG. 2 is a top diagrammatic view of the host vehicle in an environment.

With reference to FIG. 2, the host vehicle 100 may be moving through an environment 205 with one or more target vehicles 200. For example, the host vehicle 100 and at least one of the target vehicles 200 may be traveling on a roadway 210 in a same direction, as shown in FIG. 2.

Between two points in time, the movement of the host vehicle 100 and each target vehicle 200 define a quantity of relative motion between the host vehicle 100 and that target vehicle 200. The relative motion is a quantity of motion of the target vehicle 200 relative to the host vehicle 100, i.e., a quantity of motion of the target vehicle 200 in a reference frame fixed to the host vehicle 100, e.g., a change from 100 feet forward and 10 feet left of the host vehicle 100 at a first time to 50 feet forward and 10 feet left of the host vehicle 100 at a second time. Equivalently, the relative motion is a difference between motion of the target vehicle 200 relative to the environment 205 and motion of the host vehicle 100 relative to the environment 205 (in vector form) from the first time to the second time.

The computer 105 is programmed to determine the quantity of relative motion between the host vehicle 100 and each target vehicle 200. For example, the computer 105 may determine the quantity of relative motion based on image data depicting the target vehicle 200, as will be described in detail below with respect to FIG. 3. For another example, the computer 105 may determine the quantity of relative motion based on range data, e.g., a point cloud, from a range sensor of the environmental sensors 115 at different times. The range sensor may be a lidar, a radar, etc. The range data may include a relative position of the target vehicle 200, and the quantity of relative motion may be a change in the relative position between a first time and a second time. For another example, the computer 105 may determine the quantity of relative motion based on a change in position of the host vehicle 100 between a first time and a second time determined from data from the motion sensors 120 and a change in position of the target vehicle 200 between the first time and the second time received from the target vehicle 200, e.g., via vehicle-to-vehicle (V2V) communications. Determining the quantity of relative motion based on the image data may be advantageous because the host vehicle 100 is more likely to include the camera 145 than a lidar and because the determination is not dependent on receiving information from the target vehicle 200.

Figure 3:
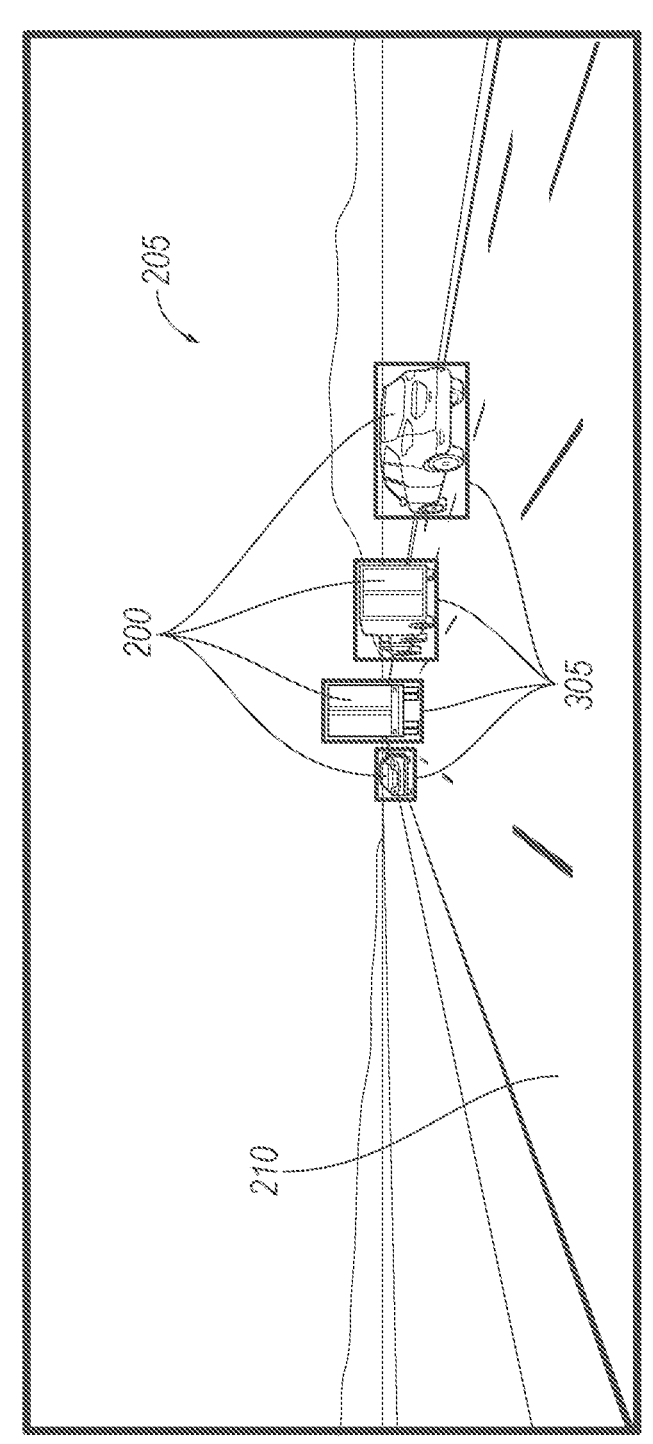
FIG. 3 is a depiction of an image frame captured by a camera of the vehicle.

With reference to FIG. 3, the computer 105 receives image data originating from the camera 145, e.g., over the communications network 110. The image data are a sequence of image frames 300 of the field of view of the camera 145. Each image frame 300 is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame 300, i.e., position in the field of view of the sensor at the time that the image frame 300 was recorded, can be specified in pixel dimensions or coordinates, e.g., an ordered pair of pixel distances, such as a number of pixels from a top edge and a number of pixels from a left edge of the image frame 300.

The computer 105 may be programmed to determine the quantity of relative motion between the host vehicle 100 and each target vehicle 200 based on the image data depicting the target vehicles 200. The quantity of relative motion is between a first time and a second time, and the image data includes a first image frame 300 depicting the target vehicles 200 at the first time and a second image frame 300 depicting the target vehicles 200 at the second time. The quantity of relative motion includes a metric of change between the target vehicle 200 as depicted in the first image frame 300 and the target vehicle 200 as depicted in the second image frame 300. For the purposes of this disclosure, a "metric of change" is defined as a numerical quantity describing a comparison of two depictions in image data. As an overview, for each target vehicle 200, the computer 105 may determine a first set of pixels forming the target vehicle 200 in the first image frame 300 and a second set of pixels forming the target vehicle 200 in the second image frame 300, and compare the first set of pixels with the second set of pixels to determine the metric of change. As a more detailed overview of the steps that will be described below, the computer 105 may perform semantic segmentation classifying pixels in the image frames 300 as belonging to a vehicle, perform object identification on the image frames 300 to identify the target vehicles 200, apply bounding boxes 305 around the identified vehicles, determine the first set of pixels for each target vehicle 200 as the pixels of the first image frame 300 that are both inside the respective bounding box 305 and classified as belonging to a vehicle, determine the second set of pixels for each target vehicle 200 as the pixels of the second image frame 300 that are both inside the respective bounding box 305 and classified as belonging to a vehicle, extract a first set of features from the first set of pixels, extract a second set of features from the second set of pixels, identify each target vehicle 200 in the second image frame 300 as a same vehicle as the respective target vehicle 200 in the first image frame 300, determine a set of feature correspondences for each target vehicle 200 between the respective first set of pixels and the respective second set of pixels, determine per-pixel shifts between the feature correspondences, and determine the mean pixel shift for each target vehicle 200 from the per-pixel shifts. The result of these steps is a determination of how close each target vehicle 200 is to being stationary within the image plane of the camera 145 over time (specifically from the first image frame 300 to the second image frame 300), which indicates the extent of the relative motion.

The computer 105 may be programmed to perform semantic segmentation classifying pixels in the first image frame 300 and second image frame 300 into categories. For example, the computer 105 may execute a semantic segmentation algorithm. A semantic segmentation algorithm labels each pixel in an image with a category. The categories include at least a first category and a second category and may include more than two categories. At least one category, e.g., the first category, indicates vehicles, i.e., classifies pixels as belonging to a vehicle. The categories indicating vehicles may include a single category such as {vehicle} or multiple categories such as {consumer vehicle, commercial vehicle, semi-truck}. The categories can be stored in the computer 105 as a list, e.g., {road, sidewalk, ground, trees, consumer vehicle, commercial vehicle, semi-truck, bicycle, pedestrian, animal, building/wall, traffic sign, traffic light, sky}. The semantic segmentation algorithm can be a machine-learning algorithm, e.g., a deep neural network, a convolutional neural network, etc. One such machine-learning algorithm for performing semantic segmentation is Panoptic-Deeplab-v3. Another is Detectron2, and other examples exist. For another example, the computer 105 may execute a panoptic segmentation algorithm, which is a combination of semantic segmentation and instance segmentation.

The computer 105 may be programmed to perform object identification on the first image and the second image to identify the target vehicles 200. This step may be independent of performing semantic segmentation. The computer 105 can identify the target vehicles 200 using conventional image-recognition techniques, e.g., a machine-learning program such as a convolutional neural network or an encoder-decoder neural network, e.g., YOLOP. The machine-learning program may accept the image frames 300 as input and output identifications of objects in the image frames 300.

The computer 105 may be programmed to apply bounding boxes 305 around the respective identified target vehicles 200 in the first image frame 300 and second image frame 300. For example, the computer 105 may execute a machine-learning program. The machine-learning program may be the same program as used to identify the vehicles and may output the positions of the bounding boxes 305 paired with the respective identifications of the objects as vehicles, e.g., YOLOP.

The computer 105 may be programmed to, for each target vehicle 200, determine the first set of pixels belonging to the target vehicle 200 in the first image frame 300 and the second set of pixels belonging to the target vehicle 200 in the second image frame 300. The computer 105 may determine the first set of pixels and second set of pixels based on the pixels classified as the first category (i.e., as vehicles) by the semantic segmentation and/or based on the bounding boxes 305. For example, the first set of pixels and second set of pixels may be from pixels that are both inside the bounding boxes 305 and classified as the first category. For example, the computer 105 may perform mask multiplication of a segmentation mask of the first image frame 300 and a bounding-box mask of the first image frame 300 (and do the same for the second image frame 300). The segmentation mask may code each pixel in the first category as "1" and the remaining pixels as "0." The bounding-box mask may code each pixel in the respective bounding box 305 as "1" and each pixel outside the respective bounding box 305 as "0." The mask multiplication is a pixelwise multiplication, so the value for a pixel is "1" if the respective pixel has a value of "1" in both the segmentation mask and the bounding-box mask, and the value for that pixel is "0" otherwise. The computer 105 may further set the values for pixels to "0" if the pixels are part of a contiguous region that is below a size threshold, e.g., 0.04% of the area of the image frame 300. The first set of pixels are the pixels with a value of "1" as a result of the mask multiplication for the first image frame 300, and the second set of pixels are the pixels with a value of "1" as a result of the mask multiplication for the second image frame 300. The mask multiplication and the size threshold each help to reduce noise in the first and second sets of pixels.

The computer 105 may be programmed to extract a first set of features from the first set of pixels, and extract a second set of features from the second set of pixels. For the purposes of this disclosure, the term "feature" is used in its computer-vision sense as a piece of information about the content of an image, specifically about whether a certain region of the image has certain properties. Types of features may include edges, corners, blobs, etc. Extracting the features includes executing a feature extractor. The types of features may be chosen to be typically visible and trackable from a rear view of a typical target vehicle 200. The feature extractor may include one or more suitable techniques for feature extraction, e.g., low-level techniques such as edge detection, corner detection, blob detection, ridge detection, scale-invariant feature transform (SIFT), etc.; shape-based techniques such as thresholding, blob extraction, template matching, Hough transform, generalized Hough transform, etc.; flexible methods such as deformable parameterized shapes, active contours, etc.; etc. The feature extractor may include machine-learning operations. For example, the feature extractor may include residual network (ResNet) layers followed by a convolutional neural network. Alternatively, the feature extractor may use feature extraction techniques that do not rely on machine learning such as scale-invariant feature transform (SIFT), speeded up robust features (SURF), Oriented FAST and Rotated BRIEF (ORB) features, etc., thereby providing simpler computation while still effectively tracking features of interest for this application.

The computer 105 may be programmed to identify each target vehicle 200 in the second image frame 300 as a same vehicle as that target vehicle 200 in the first image frame 300. For example, the computer 105 may determine a closest match between the second set of features for a given target vehicle 200 and one of a plurality of first sets of features extracted for multiple target vehicles 200, e.g., using mutual nearest neighbors. The computer 105 may ignore the target vehicles 200 in the second image frame 300 that do not have a match in the first image frame 300 in the remaining steps for determining the quantity of relative motion.

The computer 105 may be programmed to compare the first set of features with the second set of features for each target vehicle 200, e.g., to determine a set of feature correspondences between the first set of pixels and the second set of pixels for each target vehicle 200. Each feature correspondence is a pairing of one of the features in the first set of features with one of the features in the second set of features, which may have the same or different pixel coordinates. The feature correspondences may be an output of mutual nearest neighbors.

The computer 105 may be programmed to determine the metric of change between the target vehicle 200 as depicted in the first image frame 300 and the target vehicle 200 as depicted in the second image frame 300, e.g., the mean pixel shift based on the first set of pixels and the second set of pixels. For example, the computer 105 may determine per-pixel shifts between the feature correspondences. The per-pixel shift for each feature correspondence may be a change in the pixel coordinates of the paired features, e.g., a pixel distance, e.g., a Euclidean pixel distance. The computer 105 may determine the mean pixel shift from the per-pixel shifts. The mean pixel shift may be the mean of the pixel distances, i.e., the sum of the pixel distances divided by the number of feature correspondences.

The computer 105 is programmed to determine whether the quantity of relative motion, e.g., the metric of change, e.g., the mean pixel shift, is above or below a threshold. The threshold is chosen to indicate whether the target vehicle 200 is nearly stationary relative to the host vehicle 100. In response to the quantity of relative motion being below the threshold, the computer 105 determines the pose of the host vehicle 100 subject to a constraint on motion of the host vehicle 100, which will be described below. In response to the quantity of the relative motion being above the threshold, the computer 105 determines the pose of the host vehicle 100 without the constraint.

The constraint constrains the determined pose of the host vehicle 100 toward a predicted pose; i.e., the constraint operates to change the value of the determined pose toward the predicted pose. For example, the computer 105 may determine the pose from within a narrower range of possible poses or weighted toward a narrower range of possible poses. The example described in detail below weights the determined pose toward a narrower range of possible poses. The predicted pose may be a current pose translated by a distance in a current direction of travel of the host vehicle 100. The distance may be a product of a timestep and a current velocity of the host vehicle 100, e.g., as in the following equation:

$$\bar{M}_{k+1} = M_k + \delta V_k$$

in which k is an index of timesteps, $\bar{M}_{k+1}$ is the predicted pose at a timestep k+1, $M_k$ is the measured pose at a timestep k, $\delta$ is the length of the timesteps, and $V_k$ is the velocity vector at the timestep k.

The constraint may be implemented through a measurement variance. The measurement variance is a value indicating noise in measurements of the pose $M_k$ of the host vehicle 100. The measurements of the pose originate from sensor data from sensors of the host vehicle 100, as will be described below.

Determining the pose subject to the constraint may include changing the value of the measurement variance. For example, the constraint may be an increase in value of the measurement variance. An increase in the measurement variance may increase the weight given to the predicted pose compared to the weight given to the measured pose, tending the determined pose more toward the predicted pose than toward the measured pose. For example, the value of the measured variance may be changed according to a radial basis function kernel, e.g., by changing the value of a parameter of the radial basis function kernel. The radial basis function kernel is given by an exponential of the negative product of the parameter and the squared norm of the difference between the measured and predicted poses of the host vehicle 100, e.g., for each translational axis, e.g., as in the following equations:

$$K_x = \exp\left(\frac{-\|M_{k+1,x} - \bar{M}_{k+1,x}\|^2}{2\sigma_x^2}\right)$$

$$K_y = \exp\left(\frac{-\|M_{k+1,y} - \bar{M}_{k+1,y}\|^2}{2\sigma_y^2}\right)$$

$$K_z = \exp\left(\frac{-\|M_{k+1,z} - \bar{M}_{k+1,z}\|^2}{2\sigma_z^2}\right)$$

in which the subscripts x, y, and z indicate the translational axes; K is the radial basis function kernel along one axis; exp( ) is the exponential function, i.e., Euler's number e raised to the power of the argument; and $\sigma$ is the parameter, also called the bandwidth. The radial basis function kernel may be reformulated to equivalently use the parameter $\gamma=\frac{1}{2}\sigma^2$. When the constraint is being used, i.e., when the quantity of relative motion is below the threshold, the parameters for the two horizontal axes $\sigma_x$ and $\sigma_y$ may be decreased by a preset factor $\alpha$. The measurement variance may be based on the radial basis function kernel, e.g., as follows:

$$v_m = v_{m,def} + \left(\frac{1}{K_x} - 1\right) + \left(\frac{1}{K_y} - 1\right) + \left(\frac{1}{K_z} - 1\right)$$

in which $v_m$ is the measurement variance and $v_{m,def}$ is a default value of the measurement variance. The radial basis function kernel is useful for penalizing larger deviations comparatively more than smaller deviations.

The computer 105 is programmed to determine the pose of the host vehicle 100, e.g., according to data from the environmental sensors 115 and motion sensors 120 and a motion model of the host vehicle 100, as will be described below. The computer 105 determines the pose subject to the constraint if the quantity of relative motion is below the threshold and without the constraint if the quantity of relative motion is above the constraint. For example, the computer 105 may determine the pose of the host vehicle 100 based on the measurement variance, and the measurement variance may change value depending on whether the quantity of relative motion is above or below the threshold, as described above.

As a specific example, the computer 105 may determine the pose of the host vehicle 100 by executing a Kalman filter. The Kalman filter works by forming a feedback loop between a prediction step, i.e., predicting the vehicle pose and error estimates for a next time step using prediction equations, and a measurement step, i.e., adjusting the predictions with measurements from the sensors using measurement equations. The Kalman filter may be an extended Kalman filter.

The Kalman filter tracks the movement of the host vehicle 100 through space with state variables. The state variables of the Kalman filter include the pose of the host vehicle 100, the velocity of the host vehicle 100, and the rotation of the host vehicle 100. The pose may be a six-degree of freedom pose, e.g., including three spatial dimensions and three angular dimensions. The velocity may be a three-dimensional vector. The rotation may be represented equivalently by a rotation vector (i.e., roll, pitch, and yaw), a rotation matrix, or a quaternion.

The prediction step predicts the values for the state variables based on the values of the state variables at the previous timestep and the motion data from the motion sensors 120. The prediction step may be based on a physics-based model of the motion of the host vehicle 100. For example, the equations below are derived from the kinematic bicycle model of vehicle motion. The position of the host vehicle 100 may be predicted based on the position at the previous timestep, the velocity at the previous timestep, the rotation at the previous timestep, and acceleration data from the motion data, as in the following equation:

$$p_k = p_{k-1} + \delta v_{k-1} + \frac{1}{2}\delta^2 R_{k-1} i_a$$

in which k is the index of the timesteps, $p_k$ is the three-dimensional position at the timestep k, $\delta$ is the length of each timestep, $v_k$ is the three-dimensional velocity vector at the timestep k, $R_k$ is the rotation matrix at the timestep k, and $i_a$ is the three-dimensional acceleration from the motion data. The velocity of the host vehicle 100 may be predicted based on the velocity at the previous timestep, the rotation at the previous timestep, and acceleration data from the motion data, as in the following equation:

$$v_k = v_{k-1} + \delta R_{k-1} i_a$$

The rotation of the host vehicle 100 may be predicted based on the rotation at the previous timestep and the angular velocity from the motion data, as in the following equation:

$$q_k = q\{\delta I_v\} \otimes q_{k-1}$$

in which $q_k$ is the quaternion representing the rotation at the timestep k, q{ } is the transform from the rotation vector to the quaternion, $I_v$ is the three-dimensional angular velocity from the motion data, and $\otimes$ denotes quaternion multiplication.

The measurement step corrects the predicted value for the state variables based on a gain of the Kalman filter and a covariance of the Kalman filter, which in turn are based on a process variance and the measurement variance. The process variance, also called the process noise, represents uncertainty inherent to the motion model. As an overview of the measurement step, the computer 105 calculates the covariance based on the process variance, calculates the gain based on the covariance and the measurement variance, and corrects the state variables based on the gain.

The computer 105 calculates the covariance based on the process variance. To do so, the computer 105 first calculates the process Jacobian as follows:

$$A = \begin{bmatrix} a_x \\ a_y \\ a_z \end{bmatrix}_x \quad F_x = \begin{bmatrix} I_3 & I_3\delta & 0_{3\times3} \\ 0_{3\times3} & I_3 & -R_{k-1}A\delta \\ 0_{3\times3} & 0_{3\times3} & R^T\{I_v\delta\} \end{bmatrix}$$

in which $a_x$, $a_y$, and $a_z$ are the components of the acceleration from the motion data; [ ]$_x$ denotes a vector as a skew-symmetric matrix; $F_x$ is the process Jacobian; $I_e$ is an e×e identity matrix; $0_{e\times f}$ is an e×f matrix with "0" for the entries; and R{ } denotes the rotation matrix representation of an angle-axis representation of the argument. The computer 105 also calculates the process noise covariance based on the process variance as follows:

$$Q = \begin{bmatrix} I_6 v_p \delta^2 \end{bmatrix}$$

in which Q is the process noise covariance and $v_p$ is the process variance. The computer 105 also calculates the Jacobian of the process noise as follows:

$$F_w = \begin{bmatrix} 0_{3\times3} & 0_{3\times3} \\ I_3 & 0_{3\times3} \\ 0_{3\times3} & I_3 \end{bmatrix}$$

The computer 105 calculates the covariance as follows:

$$C_k = F_x C_{k-1} F_x^T + F_w Q F_w^T$$

The computer 105 calculates the gain of the Kalman filter based on the measurement variance, as well as based on the covariance and a measurement model. The gain may be calculated as follows:

$$G = C_k H^T \left( H C_k H^T + v_m I_6 \right)^{-1}$$

in which G is the gain, H is the Jacobian of the measurement model, and $v_m$ is the measurement variance. The measurement model may include a perspective-n-point (PnP) algorithm. The PnP algorithm determines a pose of the camera 145 based on three-dimensional points in the environment 205 and corresponding pixel coordinates for those points in the image frame 300, as is known. The pose of the camera 145 may be converted to a pose of the host vehicle 100 by applying a prestored geometric transformation.

The computer 105 corrects the state variables based on the gain. The corrected state variables may be a sum of the predicted state variables and a difference between the predicted state variable and the measured state variable, the difference being weighted by the gain. The difference weighted by the gain is sometimes referred to as the state error and may be given by the following equation:

$$\delta x = G(y - x)$$

in which x is a collection of the state variables (e.g., pose, velocity, and rotation) and y is a collection of the measured values of the state variables. The measured state variables may be determined from the measurement model, e.g., the PnP algorithm. The corrected state variables are then the sum of the predicted state variables and the state error, as given in the following equation:

$$\hat{x} = x + \delta x$$

in which $\hat{x}$ is the updated state variables.

The computer 105 may update the covariance for the next iteration of the Kalman filter. The covariance may be based on the gain, the measurement model, and the previous covariance, e.g., as in the following equation:

$$\hat{C}_k = \left( I_9 - GH \right) C_k$$

in which the circumflex indicates the updated value. The computer 105 may further update the covariance based on the state error, e.g., the state error of the orientation, i.e., the angular components of the pose, as in the following equation:

$$\hat{C}_k = J\hat{C}_k J$$

in which J is the following Jacobian:

$$J = \begin{bmatrix} \mathbb{I}_3 & 0_{3\times3} & 0_{3\times3} \\ 0_{3\times3} & \mathbb{I}_3 & 0_{3\times3} \\ 0_{3\times3} & 0_{3\times3} & \mathbb{I}_3 - 0.5\delta\theta \end{bmatrix}$$

in which $\delta\theta$ is the angular components of the state error $\delta x$.

When the quantity of relative motion is below the threshold, the measurement variance has a comparatively greater value than when the quantity of relative motion is above the threshold. A greater value for the measurement variance causes a smaller value for the gain and a smaller correction of the predicted state variables. In other words, the prediction step is given comparatively more weight, causing the corrected state variables to be closer to the predicted state variables, i.e., to be constrained toward the predicted state variables. The computer 105 may output the corrected state variables (including the pose) as the determined state variables.

Figure 4:
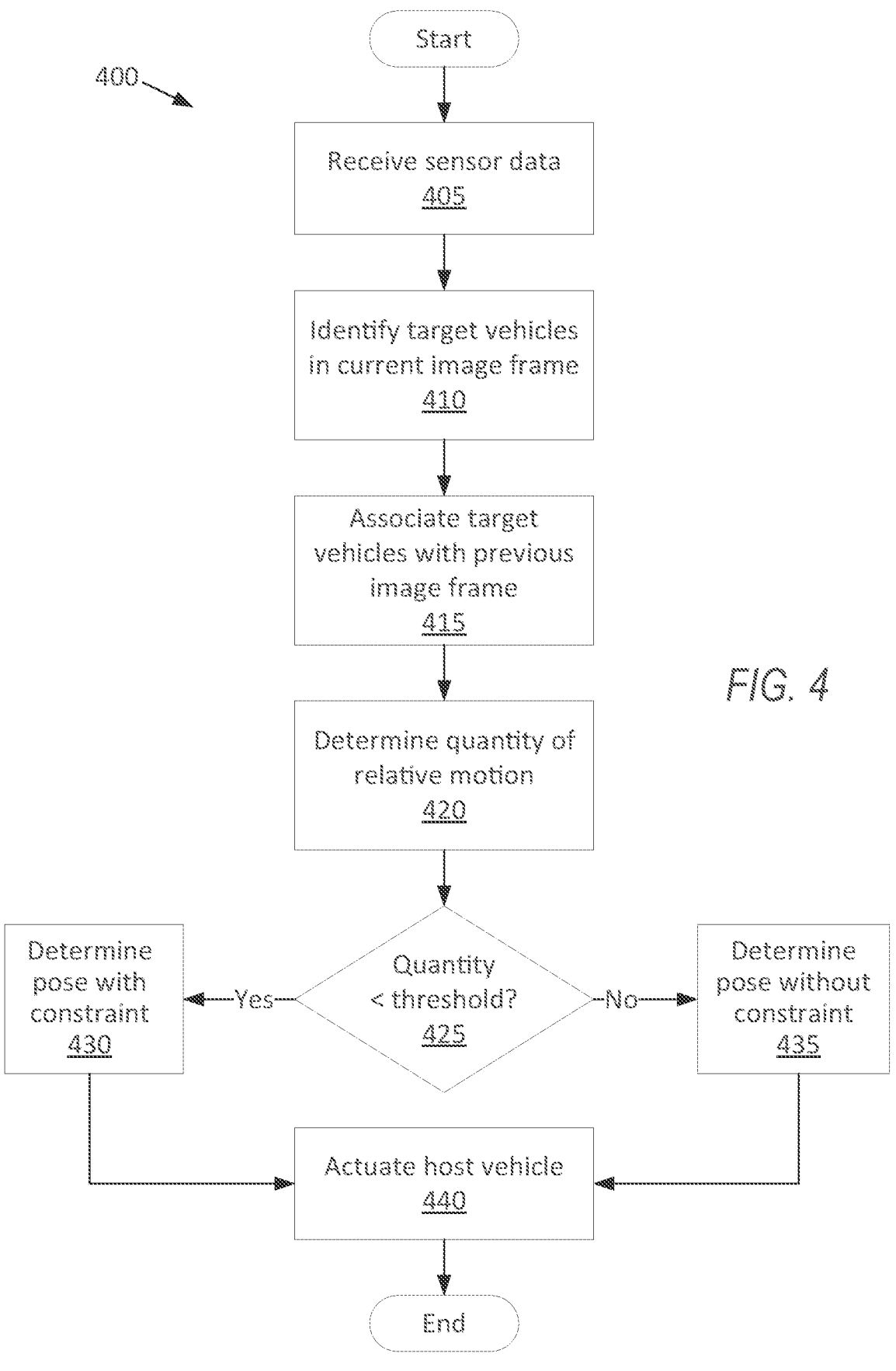
FIG. 4 is a flowchart of an example process for determining a pose of the host vehicle.

FIG. 4 is a flowchart illustrating an example process 400 for determining the pose of the host vehicle 100. The memory of the computer 105 stores executable instructions for performing the steps of the process 400 and/or programming can be implemented in structures such as mentioned above. As a general overview of the process 400, the computer 105 receives the sensor data, identifies the target vehicles 200 in a current image frame 300, associates the target vehicles 200 in the current image frame 300 with the target vehicles 200 in a previous image frame 300, and determines the quantity of relative motion. In response to the quantity of relative motion being below the threshold, the computer 105 determines the pose of the host vehicle 100 subject to the constraint on motion of the host vehicle 100. In response to the quantity of relative motion being above the threshold, the computer 105 determines the pose of the host vehicle 100 without the constraint. In either case, the computer 105 actuates a component of the host vehicle 100 based on the pose of the host vehicle 100. The process 400 may be repeated as each image frame 300 is delivered to the computer 105.

The process 400 begins in a block 405, in which the computer 105 receives the image frame 300 from the camera 145 and the motion data from the motion sensors 120.

Next, in a block 410, the computer 105 identifies the target vehicles 200 in the image frame 300, e.g., identifies the sets of pixels forming the respective target vehicles 200 in the image frame 300, as described above.

Next, in a block 415, the computer 105 identifies the target vehicles 200 in the image frame 300 as being the same as respective target vehicles 200 from a previous image frame 300 (e.g., the immediately previous image frame 300), i.e., associates the target vehicles 200 in the current image frame 300 with respective target vehicles 200 in the previous image frame 300, e.g., associates the set of pixels for each target vehicle 200 in the current image frame 300 with a respective set of pixels for the same target vehicle 200 in the previous image frame 300, as described above.

Next, in a block 420, the computer 105 determines the quantity of relative motion for each target vehicle 200, as described above.

Next, in a decision block 425, the computer 105 determines whether the quantity of relative motion for any of the target vehicles 200 is below the threshold, as described above. In response to the quantity of relative motion for at least one of the target vehicles 200 being below the threshold, the process 400 proceeds to a block 430. In response to all the quantities of relative motion for the target vehicles 200 being above the threshold, the process 400 proceeds to a block 435.

In the block 430, the computer 105 determines the pose of the host vehicle 100 subject to the constraint on motion of the host vehicle 100, as described above. After the block 430, the process 400 proceeds to a block 440.

In the block 435, the computer 105 determines the pose of the host vehicle 100 without the constraint, as described above. After the block 435, the process 400 proceeds to a block 440.

In the block 440, the computer 105 actuates a component of the host vehicle 100 based on the pose of the host vehicle 100. The component may include, e.g., the propulsion system 125, the brake system 130, the steering system 135, and/or the user interface 140. In other words, the computer 105 may actuate at least one of the propulsion system 125, the brake system 130, the steering system 135, or the user interface 140 based on the pose of the host vehicle 100. For example, the computer 105 may actuate the component as part of executing an advanced driver assistance system (ADAS). ADAS are groups of electronic technologies that assist operators in driving and parking functions. Examples of ADAS include forward collision detection, lane-departure detection, blind-spot detection, automatic braking, adaptive cruise control, lane-keeping assistance, etc. For example, the computer 105 may actuate the steering system 135 or user interface 140 based on the distances to lane boundaries as part of a lane-centering feature, e.g., steering to prevent the host vehicle 100 from traveling too close to the lane boundaries. The computer 105 may identify the lane boundaries from map data and/or sensor data, e.g., from the camera 145 or another environmental sensor 115. The computer 105 may, if the pose of the host vehicle 100 from the block 430 or 435 is within a distance threshold of one of the lane boundaries, instruct the steering system 135 to actuate to move the host vehicle 100 away from that lane boundary or instruct the user interface 140 to output a message to the operator indicating that the host vehicle 100 is close to the lane boundary. For another example, the computer 105 may operate the host vehicle 100 autonomously, i.e., actuating the propulsion system 125, the brake system 130, and the steering system 135 based on the pose, e.g., to navigate the host vehicle 100 through the environment 205. After the block 440, the process 400 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Use of "in response to" and "upon determining" indicates a causal relationship, not merely a temporal relationship. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   determine a quantity of relative motion between a host vehicle and a target vehicle;
   in response to the quantity of relative motion being below a threshold, determine a pose of the host vehicle subject to a constraint limiting the pose of the host vehicle; and
   in response to the quantity of relative motion being above the threshold, determine the pose of the host vehicle without the constraint.

2. The computer of claim 1, wherein the instructions further include instructions to actuate a component of the host vehicle based on the pose of the host vehicle.

3. The computer of claim 1, wherein the constraint constrains the pose of the host vehicle toward a predicted pose, and the predicted pose is a current pose translated by a distance in a current direction of travel of the host vehicle.

4. The computer of claim 3, wherein the distance is a product of a timestep and a current velocity of the host vehicle, the timestep being a length of time between a time index of the current pose and a time index of the predicted pose.

5. The computer of claim 1, wherein the instructions further include instructions to determine the quantity of relative motion based on image data depicting the target vehicle.

6. The computer of claim 5, wherein the image data includes a first image frame depicting the target vehicle and a second image frame depicting the target vehicle, and the quantity of relative motion includes a metric of change between the target vehicle as depicted in the first image frame and the target vehicle as depicted in the second image frame.

7. The computer of claim 6, wherein the instructions to determine the quantity of relative motion include instructions to compare a first set of pixels forming the target vehicle in the first image frame with a second set of pixels forming the target vehicle in the second image frame.

8. The computer of claim 7, wherein the metric of change is a mean pixel shift based on the first set of pixels and the second set of pixels, and the instructions to compare the first set of pixels with the second set of pixels include instructions to determine the mean pixel shift.

9. The computer of claim 7, wherein the instructions further include instructions to extract a first set of features from the first set of pixels, and extract a second set of features from the second set of pixels, and the instructions to compare the first set of pixels with the second set of pixels include instructions to compare the first set of features with the second set of features.

10. The computer of claim 9, wherein the instructions further include instructions to determine a set of feature correspondences between the first set of pixels and the second set of pixels, and determine per-pixel shifts between the feature correspondences.

11. The computer of claim 10, wherein the metric of change is a mean pixel shift based on the first set of pixels and the second set of pixels, and the instructions to compare the first set of pixels with the second set of pixels include instructions to determine the mean pixel shift from the per-pixel shifts.

12. The computer of claim 7, wherein the instructions further include instructions to perform semantic segmentation classifying pixels in the first image frame and second image frame as a first category, the first category indicating vehicles, and determine the first set of pixels and second set of pixels based on the pixels classified as the first category.

13. The computer of claim 7, wherein the instructions further include instructions to perform object identification on the first image frame and the second image frame to identify vehicles, apply bounding boxes around the respective identified vehicles, and determine the first set of pixels and second set of pixels based on the bounding boxes.

14. The computer of claim 13, wherein the instructions further include instructions to perform semantic segmentation classifying pixels in the first image frame and second image frame as a first category, the first category indicating vehicles, and the first set of pixels and second set of pixels are from pixels that are both inside the bounding boxes and classified as the first category.

15. The computer of claim 6, wherein the instructions further include instructions to identify the target vehicle in the second image frame as a same vehicle as the target vehicle in the first image frame.

16. The computer of claim 5, wherein the image data originates from a camera mounted to the host vehicle.

17. The computer of claim 1, wherein the instructions to determine the pose of the host vehicle include instructions to determine the pose of the host vehicle based on a measurement variance of sensors of the host vehicle, and the constraint is an increase in value of the measurement variance.

18. The computer of claim 1, wherein the instructions to determine the pose of the host vehicle include instructions to execute a Kalman filter, execution of the Kalman filter updates state variables over time, and the state variables of the Kalman filter include the pose of the host vehicle.

19. The computer of claim 18, wherein the instructions further include instructions to calculate a gain of the Kalman filter based on a measurement variance of sensors of the host vehicle, and the constraint is an increase in value of the measurement variance.

20. A method comprising:

determining a quantity of relative motion between a host vehicle and a target vehicle;

in response to the quantity of relative motion being below a threshold, determining a pose of the host vehicle subject to a constraint limiting the pose of the host vehicle; and in response to the quantity of relative motion being above the threshold, determining the pose of the host vehicle without the constraint.

* * * * *